United States Patent Office 3,262,379
Patented July 26, 1966

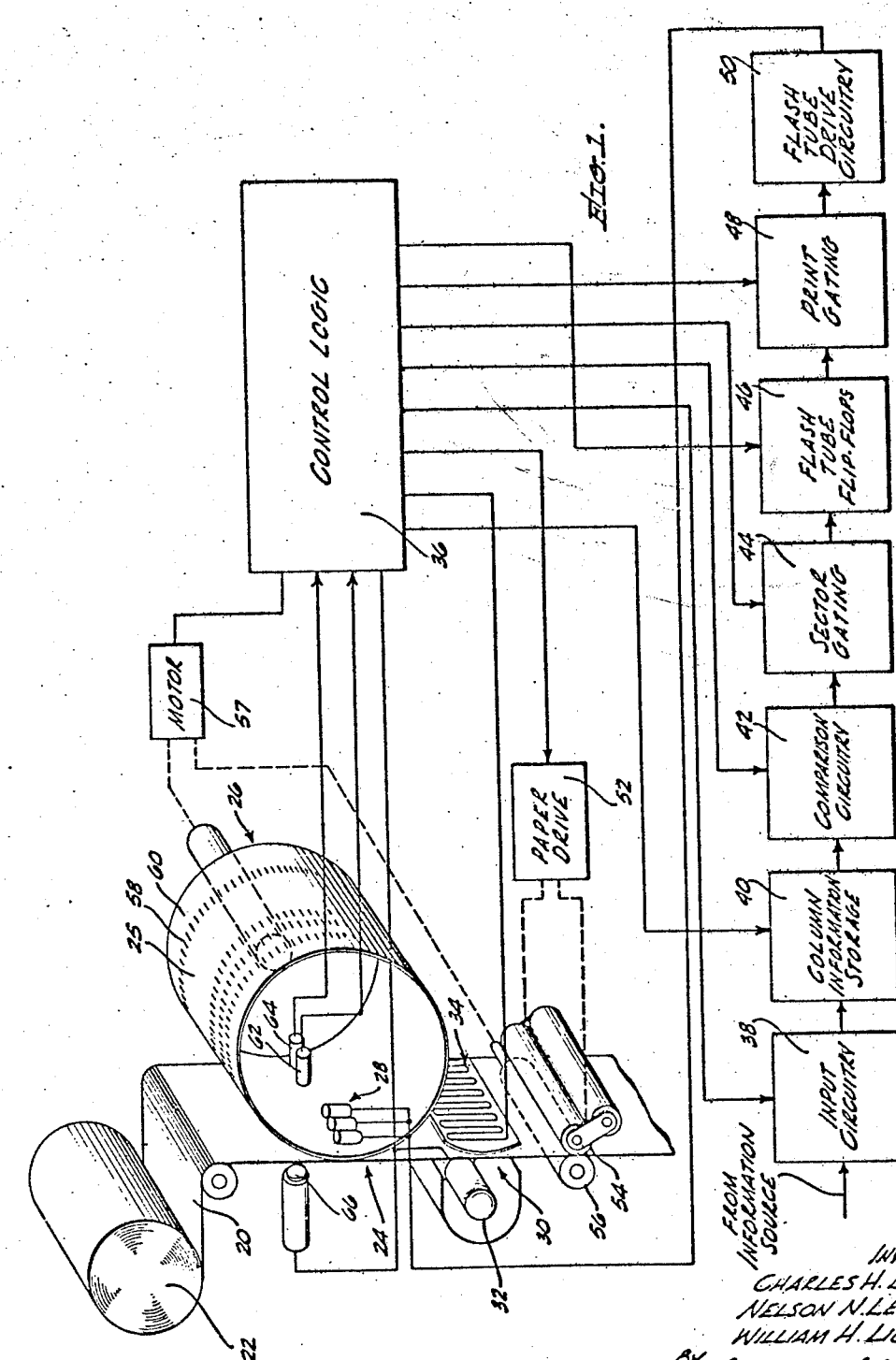

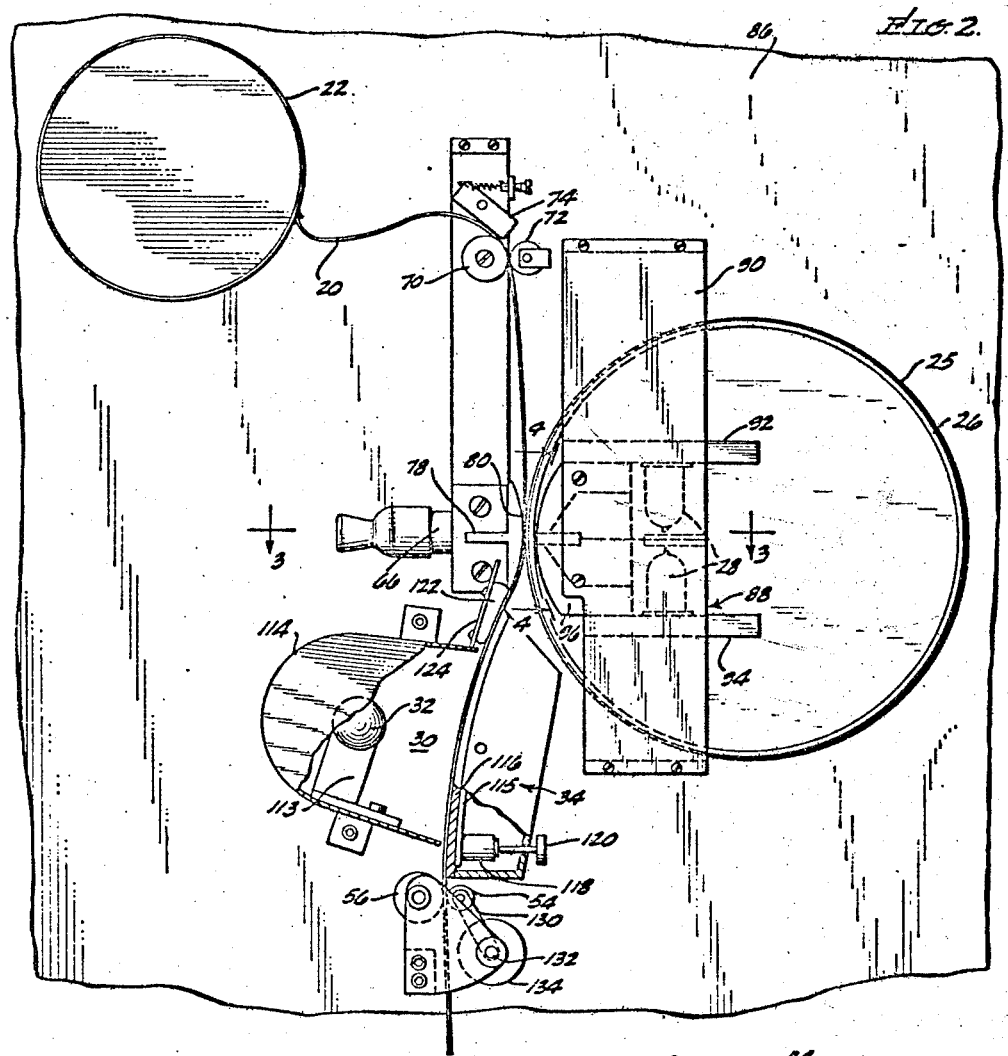
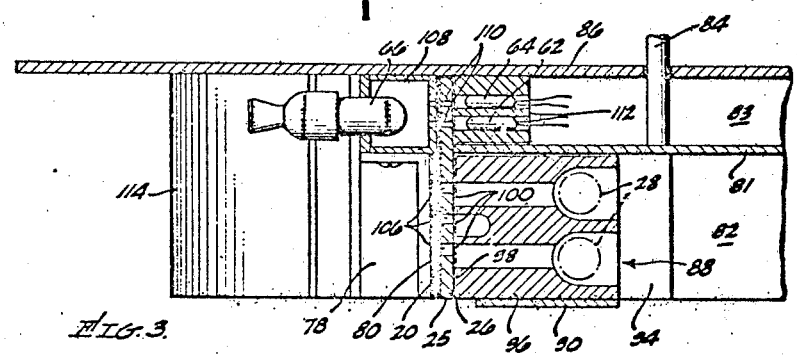

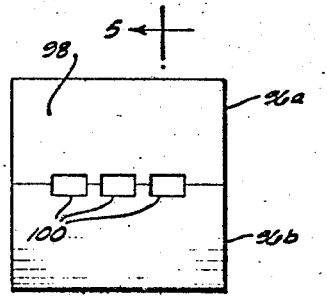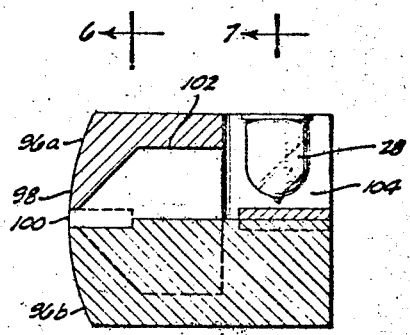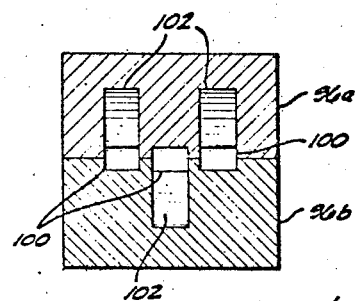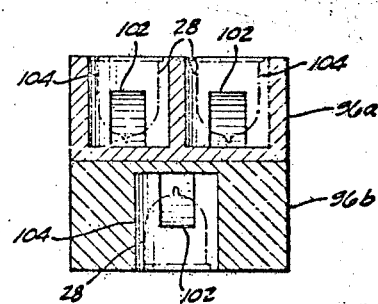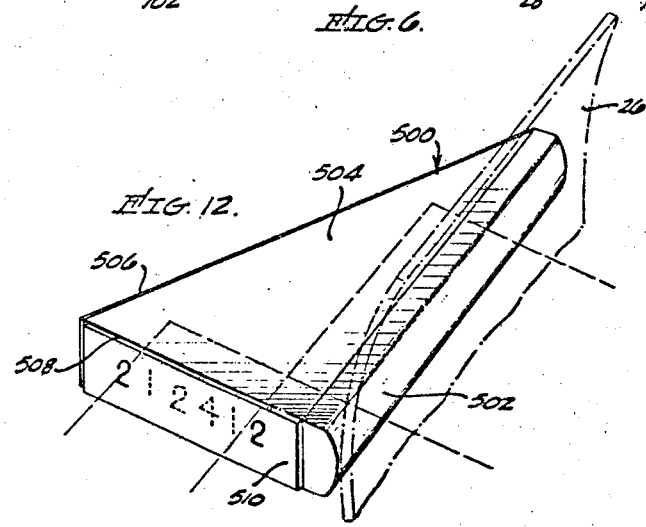

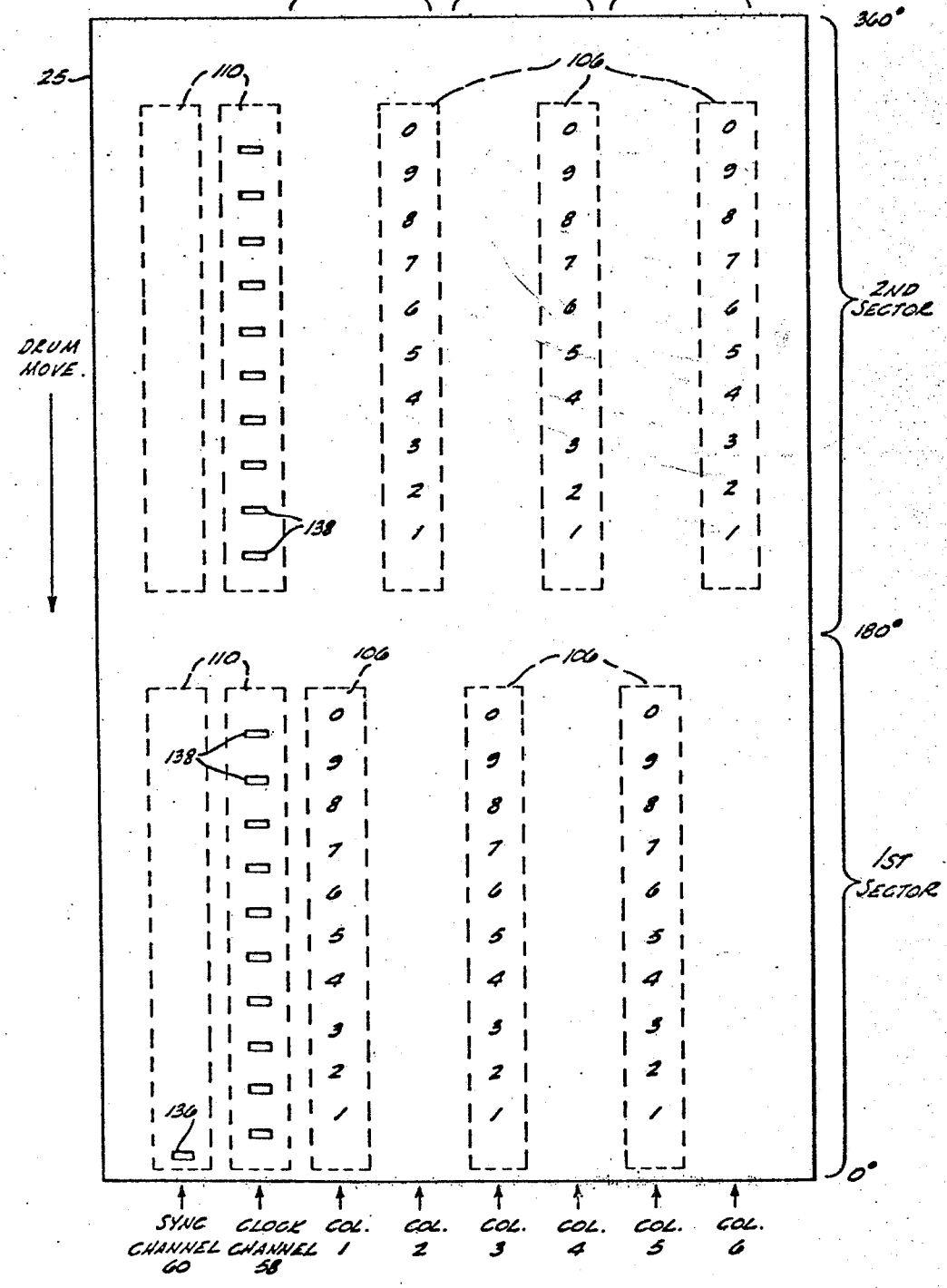

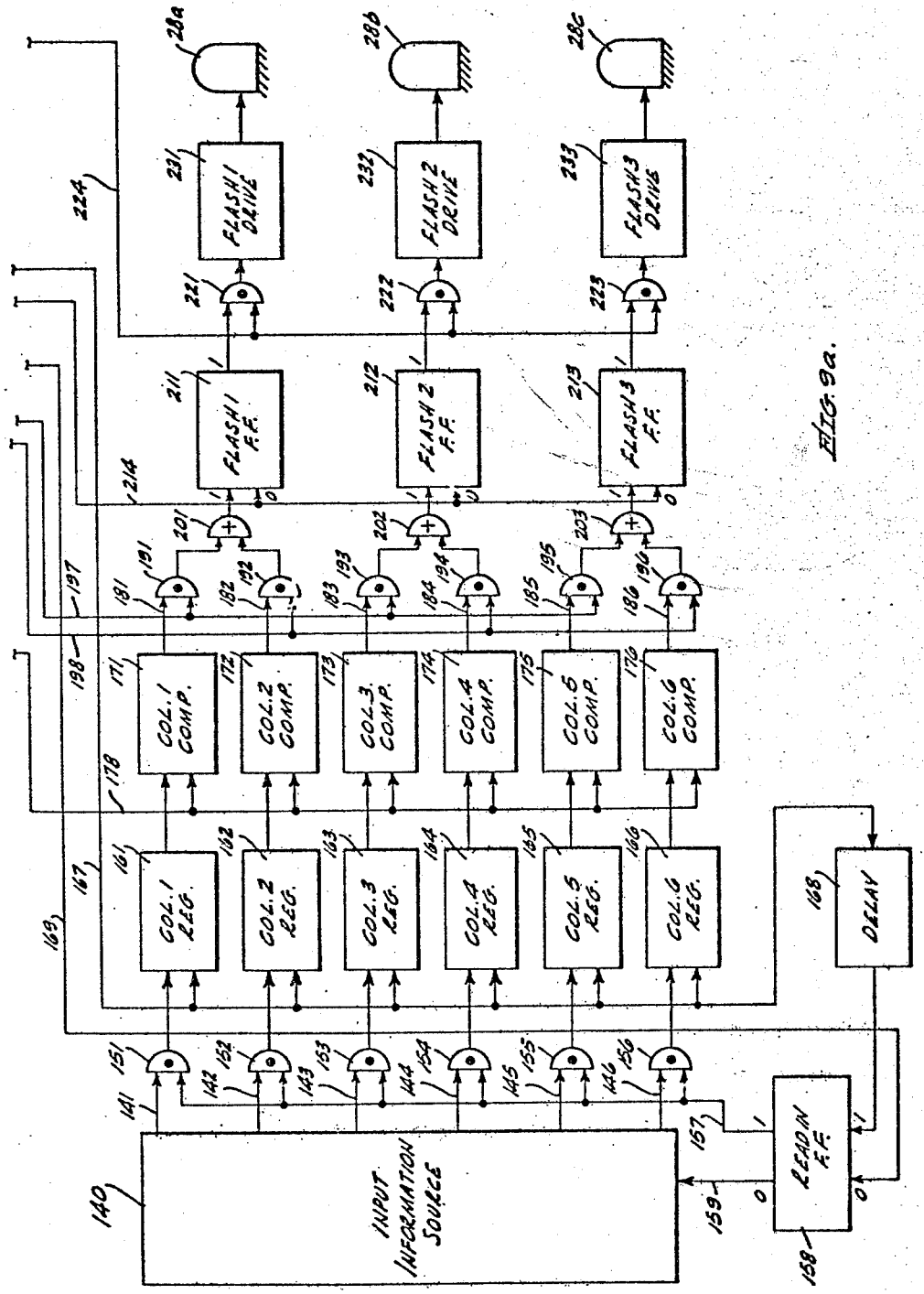

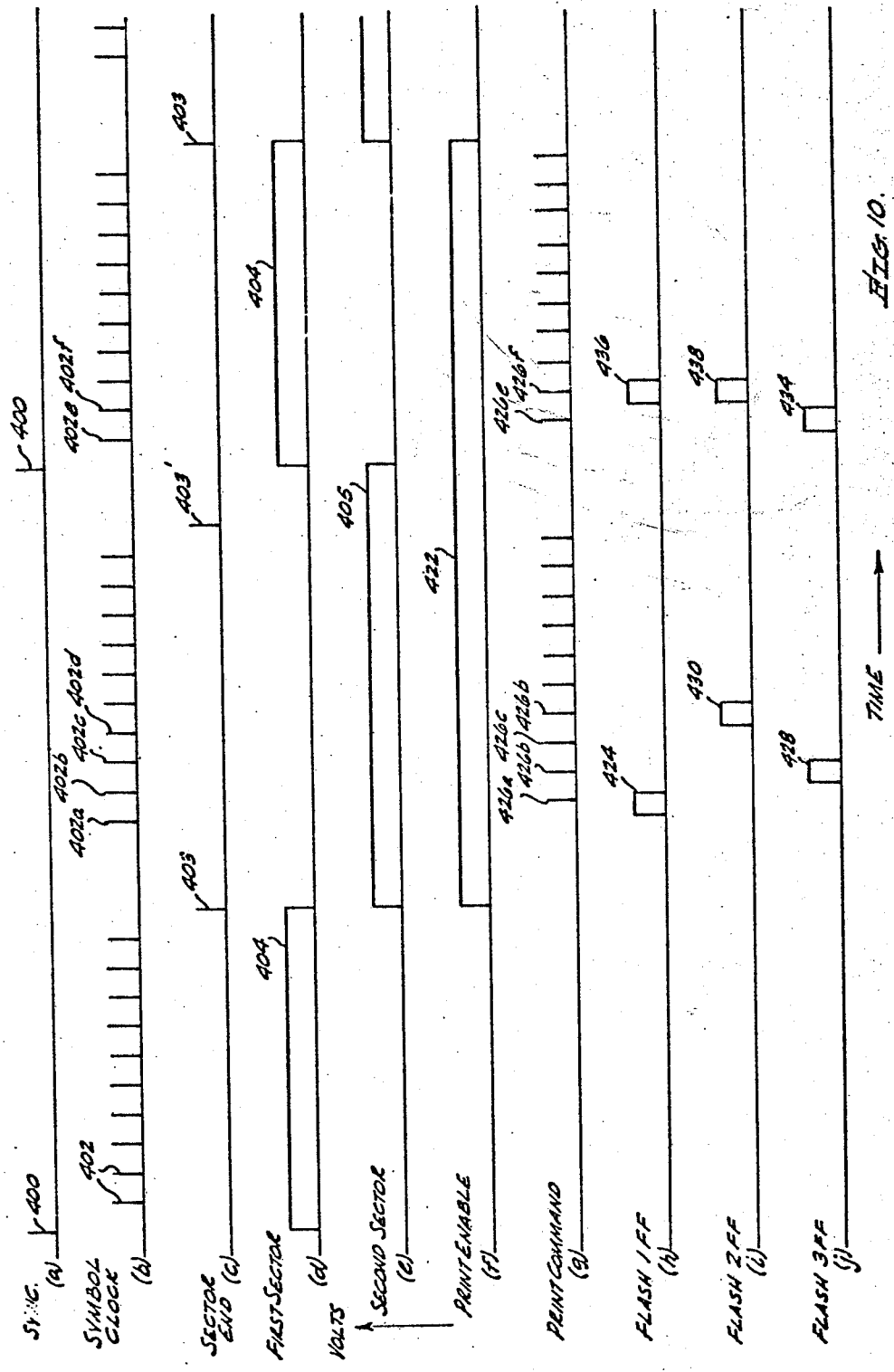

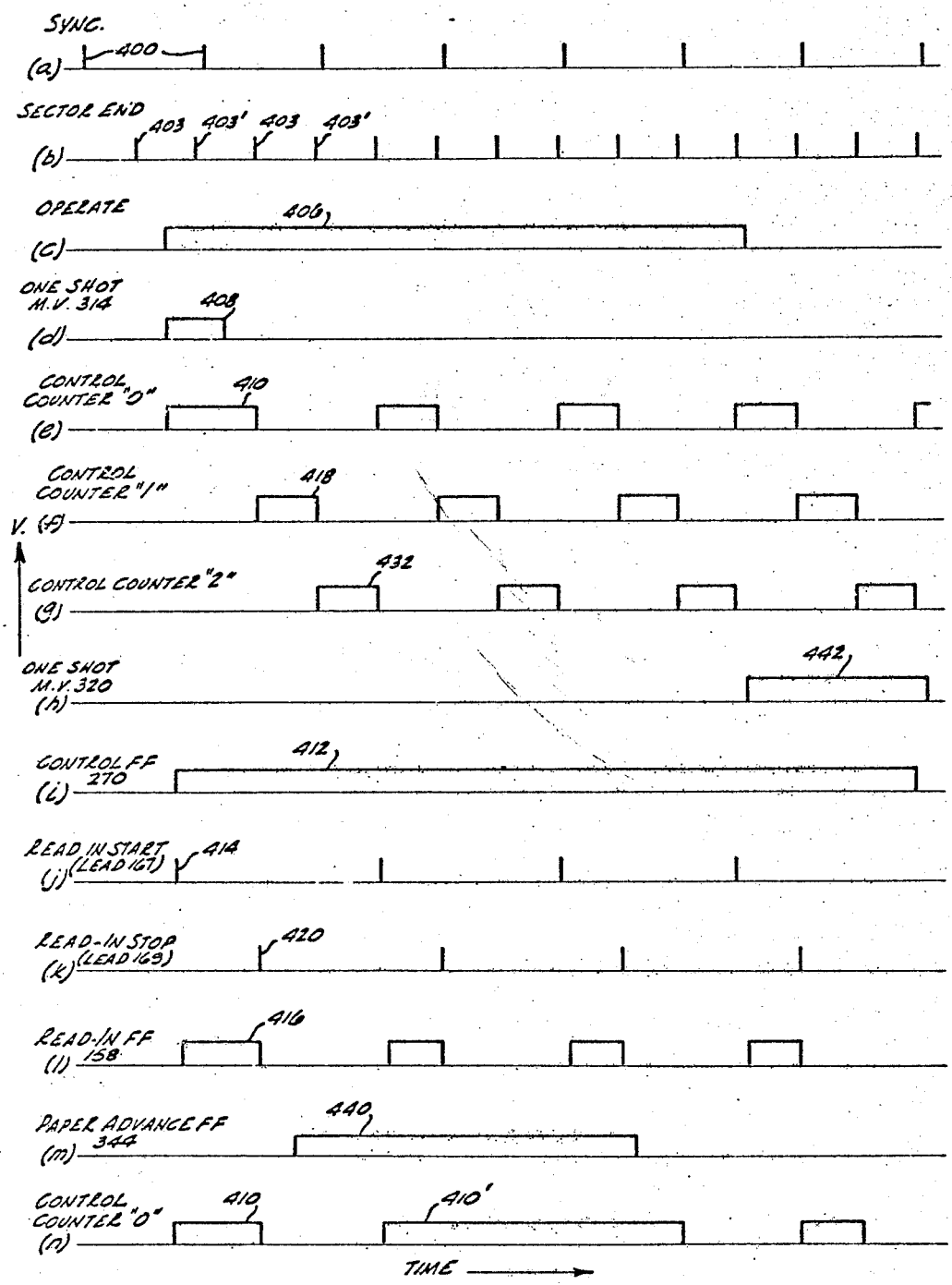

3,262,379
APPARATUS FOR HIGH SPEED PHOTO-
GRAPHIC PRINTING
Charles H. Bauer, Jr., Northridge, Nelson N. Leonard, Los Angeles, and William H. Liggett, Redondo Beach, Calif., assignors to Hughes Aircraft Company, Culver City, Calif., a corporation of Delaware
Filed May 11, 1964, Ser. No. 366,586
2 Claims. (Cl. 95—4.5)

This invention relates to high speed printing, and more particularly relates to printing apparatus in which selected indicia is printed on a photosensitive recording medium by means of programmed high intensity light pulses.

In the past, high quality printing has been afforded by a class of devices known as impact printers. Early forms of this type of printer have generally operated in a serial mode, with selected characters in a character matrix being moved mechanically to a print station for sequential contact with the recording medium. The speed of operation of such devices is, of course, limited by the motion of the individual characters, and in order to afford faster printing, on-the-fly impact printers were developed in which the characters are embodied in a continuously rotating matrix, with a plurality of printing hammers operating to print selected characters in parallel. Although parallel impact printers are able to operate at much greater speeds than serial impact printers, the parallel devices require critically designed high speed hammer assemblies in order to avoid smearing.

In addition to their slow speed, impact printers are subject to numerous other limitations. The shock and vibration attendant to hammer movement and impact not only results in considerable wear and relatively short life, but it also makes it exceedingly difficult to maintain precise and reliable hammer movement control. Also, such printers are noisy in operation, and they usually are unable to print a sequence of characters which are aligned as accurately as desired. Moreover, the impact pressure through a ribbon tends to produce blurred and diffused images.

In an effort to obtain higher printing speeds than is possible with impact printers, stylus matrix printers have been used in which current sensitive paper is passed adjacent a matrix of a plurality of electrical styli for each character to be formed. Preselected ones of the styli in each matrix are electrically energized according to the character pattern to be printed so that the regions of the paper beneath the styli are burned to produce the desired character pattern. While high speeds are possible with stylus matrix printers, the resulting printed symbols are not only of poor quality, but such printers are limited in the number of different characters that can be synthesized from the given array of lines or dots in the stylus matrix.

A further development in the high speed printing art involves electrostatic printing in which a uniform charge is first coated over a photoconductive paper by means of a corona discharge device. The images of selected characters displayed on the face of a Charactron tube are directed to the paper through fiber optics to place an opposite charge on the paper in the pattern of the characters to be printed. Oppositely charged particles dusted onto the paper at a toning station adhere to the paper in the desired character patterns. Heat applied to the paper at a fixing station then fuses these charged particles to the paper to form a permanent image. Although electrostatic printing is extremely fast and provides printing of better quality than is possible with stylus matrix printers, electrostatic printers are, nevertheless, highly complex and expensive, and the quality of the printing is considerably inferior to that achievable with impact printers.

Accordingly, it is an object of the present invention to provide high speed printing apparatus for achieving printing of a quality superior to that obtainable with impact printers and at speeds comparable to those of stylus matrix and electrostatic printers.

It is a further object of the present invention to provide a high speed printer which performs high quality printing without the shock and vibration of impact elements and without the need for precise hammer control and aligning devices.

It is a further object of the present invention to provide high quality printing apparatus which is quieter in operation and which possesses longer life and less stringent maintenance requirements than is possible with impact printers.

It is a still further object of the present invention to provide a high speed printer which produces both a sharper character image and a more accurately aligned character sequence than has been accomplished in the past.

It is still another object of the present invention to provide a high quality printer which is controllable by binary coded input data and which is operable at speeds more compatible with computer outputs than in the prior art.

It is yet another object of the present invention to provide high speed printing apparatus for producing high quality images of a wide variety of indicia including pictorial displays with theoretically no size limitation, and which apparatus is suitable for sequential tape printing, tape line printing, page line printing, and half-tone printing.

In accordance with the objects set forth above, the present invention provides apparatus for printing selected indicia contained in transparent regions of a movable mask on a photosensitive recording medium. The apparatus includes means for supporting a photosensitive surface on which printing is to occur and for moving the photosensitive surface through a printing location and a developing location. The apparatus further includes at least one intermittently operable light source and a movable mask defining a plurality of transparent regions containing indicia to be printed. Means are provided for moving the mask in a manner such that the transparent regions pass between the intermittently operable light source and the printing location. A continuously operable light source is positioned to illuminate the developing location, and electronic signal processing circuitry is provided for measuring the instantaneous position of the transparent regions on the mask relative to the printing location and in response to input signals indicative of the indicia to be printed for triggering the intermittently operable light source when the indicia corresponding to the input signals is adjacent the printing location.

Additional objects, advantages, and characteristic features of the present invention will become readily apparent from the following detailed description of preferred embodiments of the invention when taken in conjunction with the accompanying drawings in which:

FIG. 1 is a schematic diagram, partly in block form, illustrating a printer in accordance with the present invention;

FIG. 2 is a side view, partly broken away, of a printer in accordance with a preferred embodiment of the present invention;

FIG. 3 is a sectional view taken along line 3—3 of FIG. 2;

FIG. 4 is a fragmentary sectional view taken along line 4—4 of FIG. 2;

FIG. 5 is a sectional view taken along line 5—5 of FIG. 4;

Figure 9B:
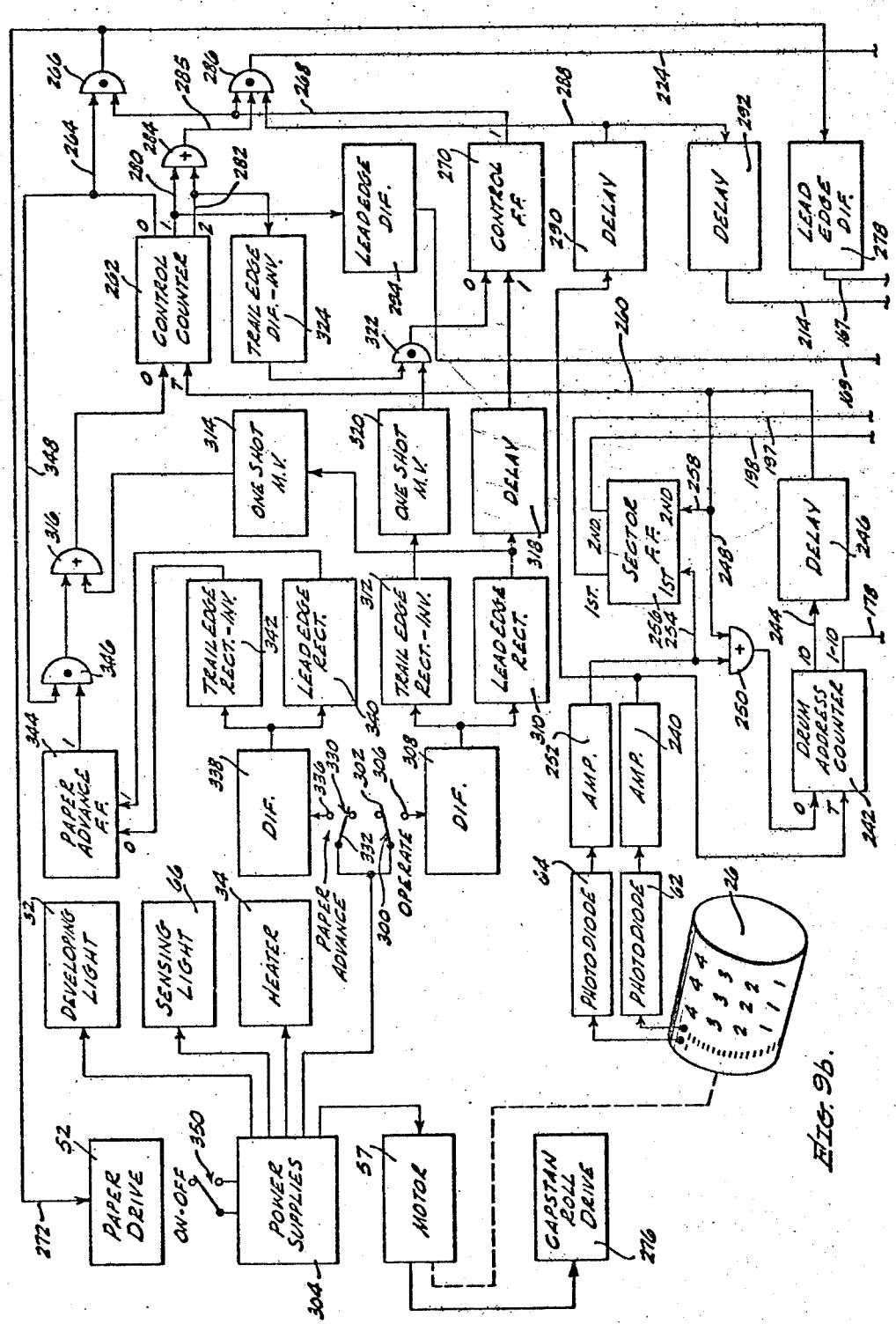

FIGS. 6 and 7 are sectional views taken along lines 6—6 and 7—7, respectively, of FIG. 5;

FIG. 8 is a layout presentational view illustrating a mask provided with indicia in accordance with an example used in describing the operation of the printer of the present invention;

FIGS. 9 (a) and (b), viewed together, constitute a block diagram illustrating electronic signal processing and control circuitry for the printer of the present invention when employing a mask indicia pattern according to FIG. 8;

FIGS. 10 (a)–(j) are graphs of waveforms vs. time showing signals at various points in the diagram of FIG. 9;

FIGS. 11 (a)–(n) are graphs of waveforms vs. time showing signals at various points in the diagram of FIG. 9 plotted on a condensed time scale relative to FIG. 10; and FIG. 12 is a perspective view illustrating a portion of a printer in accordance with the present invention which is slightly modified from that shown in FIG. 2.

Referring to FIG. 1 with more particularity, it may be seen that in a printer according to the present invention a photosensitive recording medium, such as a paper strip 20, on which printing is to occur and which may be supplied from a roll 22 is moved past a printing location, or station, 24. At the print station 24 a latent image of the indicia to be printed is formed on the paper 20 by programmed flashes of high intensity light which are projected through a moving mask 25 which carries the indicia to be printed. The mask 25 may be a photographic negative having an opaque, or black, background provided with a plurality of transparent regions each containing indicia to be printed. As is shown in FIG. 1, the mask 25 is preferably disposed around the circumferential surface of a rotatable drum 26, although other mask configurations such as discs or belts may be employed instead. The high intensity light pulses used to form the print images are generated by a plurality of intermittently operated light sources, such as flash tubes 28, disposed within the drum 26. After exposure to the programmed light flashes from the sources 28, the paper 20 is moved past a developing station 30 where light from a continuously operable source 32 is applied to the paper 20 to rapidly develop the latent image formed thereon. In order to desensitize the unexposed regions of the paper 20, the paper 20 is subjected to a high temperature during developing, and for this purpose, a heater 34 may be provided adjacent the developing station 30 to heat the paper 20 just prior to and during the developing operation.

Input signals indicative of the indicia to be printed are received from an information source, such as a computer, in the form of binary coded electrical signals. These binary coded signals are processed through electronic decoding and gating circuitry, operating under the control of control logic circuitry 36, to generate command signals which trigger the appropriate flash tubes 28 at those instants in time when the indicia on the mask 25 which it is desired to print is in the proper location adjacent the print station 24. The electronic signal processing portion of the printer includes input circuitry 38 which applies the coded input signals representative of the indicia to be printed to column information storage circuitry 40 during periods when information is not being printed. In comparison circuitry 42 the coded signals in the column information storage circuitry 40 are compared with coded signals indicative of the indicia on the mask 25 which is about to pass by the print station 24. If the desired indicia is adjacent the print station 24, the comparison circuitry 42 provides output signals which are applied to sector gating circuitry 44. The sector gating circuitry 44 ensures that the desired angular sector of the drum 26 is presently passing by the print location 24 when the indicia pattern on the mask 25 is such that a complete set of indicia is provided in each of a plurality of mask sectors at different lateral locations. Thus, the output signals from the comparison circuitry 42 are passed by the sector gating circuitry 44 only when the sector of the mask 25 containing the indicia to be printed in the selected lateral location is adjacent the print station 24. Output signals from the sector gating circuitry 44 trigger appropriate ones of a plurality of flash tube flip-flops 46, each flip-flop being associated with one of the flash tubes 28, and at the instant in time when the indicia on the mask 25 is in the print position, print gating circuitry 48 passes a signal from each flash tube flip-flop 46 which has been triggered to an associated flash tube drive circuit 50. Each selected flash tube drive circuit 50 then activates the flash tube 28 with which it is associated to apply a light pulse to the paper 20 through the desired lateral location (column) along the mask 25.

As the drum 26 rotates, signals representative of the indicia in different circumferential locations (rows) along the mask 25 are sequentially compared with the signals in the column information storage circuitry 40. Upon correspondence, each flash tube 28 associated with a lateral location (column) at which indicia, represented by an associated signal in the column information storage circuitry 40, is to be printed is triggered. After a complete revolution of the drum 26, one entire line, or row, of indicia has been printed as a latent image on the paper 20. The control logic 36 then applies a signal to a paper drive mechanism 52 which moves a pinch roller 54 into contact with the paper 20 adjacent a continuously rotating capstan roller 56. The capstan roller 56 is driven through suitable gearing from a motor 57 which also drives the drum 26. When the pinch roller 54 is moved into contact with the paper 20 in response to a signal from the control logic 36, the paper 20 is advanced so that the portion of the paper 20 on which a latent image has been formed is moved toward the developing station 30 while a fresh portion of the paper 20 is moved to the print station 24. While the paper 20 is being advanced, input signals representing the next line of indicia to be printed are read into the column information storage circuitry 40.

In order to provide timing signals which are properly synchronized with the indicia on the mask 25, the mask 25 is provided with a clock, or position indexing, channel 58 and a sync, or reference, channel 60. Respective light sensitive picking devices 62 and 64 sense light from a source 66 which passes through the clock channel 58 and the sync channel 60 in the mask 25 to generate the respective clock and sync timing pulses utilized by the control logic 36 and which will be described in more detail below.

Before describing a printer according to the present invention in more detail with reference to FIGS. 2 and 3, some essential characteristics of the paper 20 which is to receive the printing will be given. The paper 20 should be a photosensitive paper capable of being exposed by high intensity, short duration (of the order of 1–2 microseconds) flashes of light. Although any conventional photographic developing technique such as wet developing may be employed, it is preferred that the paper 20 be capable of being developed by photolysis, i.e. image intensification by subsequent exposure to bright light, for a period of time of the order of 1–5 seconds, with the unexposed regions being desensitized by the simultaneous application of heat in excess of 250° F. Examples of particular paper which may be employed are Lino-Writ 5, Lino-Writ 5 MRK 010, and Lino-Writ 7, photorecording paper, manufactured by E. I. Du Pont de Nemours and Co., Inc., Wilmington, Del.; and Linagraph Direct Print paper, manufactured by Eastman Kodak Co., Rochester, N.Y.

As shown in FIG. 2, the paper 20, which may be supplied in rolled form in a container 22, passes between a pair of paper guide rollers 70 and 72, with the proper paper tension being maintained by a tension control device 74. At the printing location the paper 20 passes between the mask 25 disposed outside of the circumferential surface of the drum 26 and a convexly curved surface 80 of a paper positioning, or guide, element 78. The convexly curved surface 80 lies parallel to the axis of rotation of the drum 26, with the spacing between the surface 80 and the nearest portion of the mask 25 being just slightly greater than the paper thickness. The temperature at the printing location may be in a widely varying range of ambient room temperature not in excess of around 100° F.

As is shown in FIG. 3, the drum 26 is mounted on a supporting plate, or disc, 81 which divides the interior portion of the drum into two regions 82 and 83. The disc 81, and hence the drum 26, is supported by a shaft 84 which is rotatably mounted relative to a panel 86 which may constitute a portion of a housing for the printer. The shaft 84 may be driven by suitable gearing (not shown) connected to the motor 57 of FIG. 1.

Mounted within the interior region 82 of the drum 26 is a stationary flash tube and light guiding assembly 88 which generates the high intensity light flashes and guides the light energy toward the appropriate regions of mask 25. The assembly 88 is supported by a plate 90 which is mounted parallel to the panel 86 on the opposite side of the drum 26 from the panel 86. The assembly 88 includes a pair of parallel support elements 92 and 94 on which the flash tubes 28 are mounted and a light guiding member 96 interposed between the elements 92 and 94 and between the flash tubes 28 and the surface of the drum 26 adjacent the paper guide element 78.

The flash tubes 28 may be any light source capable of providing controlled flashes of high intensity light for a duration of the order of a microsecond. Xenon flash tubes are particularly useful because of the panchromatic characteristic of their light output which extends from the infrared portion of the spectrum into the ultraviolet region, permitting the use of a variety of photosensitive emulsions having different spectral sensitivities. Also, xenon gas is advantageous because of its ionization and de-ionization characteristics which afford light pulses of short duration. An example of a particular light source which may be employed is an FX–6A xenon flash tube manufactured by Edgerton, Germeschausen and Grier, Inc., of Boston, Massachusetts. However, it should be understood that other sources providing short duration light flashes may be employed such as gallium arsenide semiconductor devices, although the latter sources require photosensitive emulsions which are sensitive to the red or infrared regions of the spectrum.

In order to guide the light from the flash tubes 28 to the appropriate regions of the drum 26, a light guiding assembly 96 is provided which is illustrated in more detail in FIGS. 3–7. In the example shown, three light sources 28 are employed; however, it should be understood that any number may be provided simply by extending the illustrated arrangement along a direction parallel to the drum axis. As is illustrated in FIGS. 4–7, the assembly 96 may be constructed in a pair of complementary sections 96a and 96b. At its end remote from the flash tubes 28 the assembly 96 defines a convex surface 98 which is disposed a short distance away from the inner surface of the drum 26. A plurality of laterally aligned apertures, or windows, 100 are provided in the surface 98, one for each of the flash tubes 28. The extent of each window 100 in a direction parallel to the axis of the drum 26 is selected to cover the overall width of the preselected number of columns in the mask 25 to be illuminated by the associated light source 28. Each window 100 opens into a light guiding channel, or passageway, 102 in the assembly 96 providing optical communication between a window 100 and the associated light source 28. The height of each channel 102 is greater at its end adjacent the flash tube 28 than at its end adjacent the window 100, with laterally alternate ones of the channels 102 being located primarily in different ones of the sections 96a and 96b. At its end remote from the window 100, each channel 102 opens into an enlarged substantially cylindrical recess, or cavity, 104 in the respective sections 96a or 96b for accommodating the associated flash tube 28.

The surface of the drum 26 is provided with a plurality of circumferentially extending transparent portions, preferably in the form of slots 106, with each slot 106 being aligned with one of the indicia containing columns on the mask 25. Each slot 106 lies in such lateral location along the drum 26 as to be in lateral alignment with at least a portion of one of the windows 100. Of course, more than one of the mask columns may share a particular flash tube 28, and in the particular example illustrated herein, two mask columns (hence slots 106) are adapted to pass by each window 100.

As has been mentioned above, in order to index the indicia to be printed with respect to circumferential location around the drum 26, the mask 25 is provided with a clock channel and a sync channel for use in generating timing pulses which ensure that the light flashes will be provided when the selected indicia is in the proper position adjacent one of the windows 100. For this purpose the sensing light source 66, which is mounted in a chamber 108 located between the paper guide element 78 and the panel 86, provides light which is directed toward locations traversed by the transparent marker regions in the mask 25 comprising the respective clock and sync channels 58 and 60, and which channels are aligned with transparent portions of the drum 26 such as circumferentially extending slots 110. Light passing through the clock and sync channel markers impinges upon respective light sensing devices 62 and 64 mounted in a stationary supporting element 112 which projects from the panel 86 into the region 83. The devices 62 and 64 may be any photosensitive device capable of rapidly providing an electrical output signal in response to incident light energy. Examples of sensing devices which may be employed are photocells and photodiodes, although photodiodes are preferred because of their smaller size, faster response time and relatively large electrical output signal.

As has been mentioned above, after exposure to the light flashes, the photosensitive paper 20 is moved past the lighted developing station 30 which is raised to the desired temperature by means of the heater 34. The developing station 30 comprises a continuously operable developing light source 32 mounted by means of a bracket 113 in a chamber 114 through which the paper 20 passes. The chamber 114 may be of a highly reflective metal such as aluminum, while the developing light 32 may be a high intensity tungsten light such as a photoflood lamp, for example.

The heater 34 preferably comprises an electric strip heating element 115 mounted on a metallic heat transfer plate 116 over which the paper 20 passes. A thermostat 118, having a control knob 120, may be provided to adjust the temperature of the heating element 115 to a desired value which may range from essentially 250° F. to essentially 300° F. In order to rapidly heat the paper 20 to the desired temperature prior to exposure to the developing light 32, a pressure element 122, which may be a Teflon-covered fiberglass pad, is mounted on a metal plate 124 adjacent the paper 20 between the guide element 78 and the developing chamber 114. The element 122 urges the paper 20 against the surface of the heat transfer plate 116 nearest the paper guide element 78 so that the paper 20 receives as much heat as possible prior to exposure to the developing light 32.

After emerging from the developing chamber 114, the paper 20 passes between a continuously rotating capstan roller 56 and a pinch roller 54. The pinch roller 54 is mounted on a pair of rocker arms 130 attached to a shaft 132 for pivotal movement about the shaft 132 upon activation by a rotary solenoid 134. Normally, the pinch roller 54 is maintained out of contact with the paper 20, and as a result, the paper 20 does not move. However, in response to a paper advance command signal, the rotary solenoid 134 is activated to move the pinch roller 54 into contact with the paper 20 for a selected length of time forcing the paper 20 against the rotating capstan roller 56, with the resulting friction between the paper 20 and the roller 56 causing movement of the paper 20.

In FIG. 8 there is shown an example of a pattern of indicia which may be used on the mask 25. In the example illustrated any one of the ten numerals "0" through "9" may be printed in any one of six laterally spaced columns. It should be understood, however, that the printer of the present invention is in no way restricted to printing numbers, but may print any symbol capable of being formed as a transparent area in the mask 25. As used herein the word symbol is intended to mean any indicia capable of being printed, including but not being limited to letters, numerals, punctuation marks, signs, characters, pictorial representations and designs, as well as elemental markings from which a larger composite pictorial representation may be synthesized. Moreover, a number of columns far in excess of six may be employed. The relatively small and simple pattern of symbols illustrated in FIG. 8 was chosen solely for illustrative purposes in an attempt to simplify and shorten the discussion.

A complete array of symbols to be printed (in the example shown, the numbers "0" through "9") may be disposed in a column extending substantially around the entire circumference of the drum 26, with each column adapted to print at a different lateral location, and with a different flash tube adapted to illuminate each such column at the printing location. The resulting large number of flash tubes required for such an arrangement creates a packaging problem which may necessitate a drum of excessively large diameter, especially where the number of different symbols to be printed is relatively small, as is the case in the illustrated example. The number of flash tubes required may be reduced by dividing the circumferential surface of the drum 26 into a plurality of sectors and by confining each complete array (column) of symbols to be printed at a particular lateral location to one of the sectors only. Several columns may then share the same flash tube. Thus, in the example shown in FIG. 8, the circumferential surface of the drum 26 is divided into first and second sectors, each extending for substantially 180° around the circumference of the drum. The first, third and fifth columns of symbols on the mask 25 are disposed in the first sector; while the second, fourth and sixth columns of symbols are located in the second sector. Columns 1 and 2 are adapted to be illuminated by a first flash tube 28a, columns 3 and 4 by a second flash tube 28b, and columns 5 and 6 by a third flash tube 28c. In the event it is desired to utilize only two flash tubes for a six column mask pattern, the drum surface would be divided into three sectors, each containing two columns of symbols, and with each flash tube being adapted to illuminate one column from each of the three sectors. As is shown in FIG. 8, substantial portions of the mask 25 in the vicinity of the space between sectors are maintained free of indicia in order to ensure a sufficient recovery time for the flash tubes.

As has been mentioned above, in order to generate the timing signals which synchronize the stroboscopic light flashes with the position of the drum 26, a clock channel 58 and a sync channel 60 are provided on the mask 25. The sync channel 60 comprises a single transparent region in the form of a marking slot 136 located circumferentially at the end of the first sector of the mask 25 which first passes by the sensing location so that the sync channel sensing device 64 provides a sync pulse for each complete revolution of the drum 26. The clock channel 58 comprises a plurality of transparent marking slots 138, one for each row of symbols, respectively located circumferentially a slight distance away from the associated rows of symbols in the direction of mask movement. When the clock markers 138 pass by the sensing device 62, clock pulses are generated which, after being counted, provide an index of the particular row of symbols which is about to move into printing location adjacent the windows 100. Thus, for example, the first clock pulse subsequent to a sync pulse indicates that the row containing the symbols "1" in the first, third and fifth columns is about to move into the printing location; the second clock pulse indicates that the row containing the symbols "2" in the first, third and fifth columns is about to pass the printing location, etc.

The electronic signal processing and control circuitry for a printer in accordance with the present invention, for the specific indicia pattern of FIG. 8, is shown in FIG. 9. Binary coded signals representative of the information to be printed on a given line along the paper 20 are received from an input information source 140, FIG. 9 (a), which may be a digital computer, a tape reading device, or other appropriate digital data storage or handling devices well known in the art. As is shown, the input signals are read from the information source 140 in parallel form on a plurality of leads 141–146. It should be understood that each lead 141–146 conventionally represents a flow path for a sufficient number of binary digits necessary to define each symbol to be printed in the associated column. Thus, for the example of FIG. 8 in which ten different symbols are capable of being printed, a four-bit binary code is required so that each lead 141–146 actually represents four constituent leads each carrying one bit of binary information.

Information on each of the leads 141–146 is applied to one input of respective two-input "and" gates 151–156. As used herein, the term "and" gate refers to a circuit which provides an output signal upon the coincidence of input signals at every one of its plurality of inputs, while the term "or" gate is used to identify a circuit which affords an output signal upon the presence of an input signal at any of its plurality of inputs. It is pointed out that each of the "and" gates 151–156 shown in FIG. 9 conventionally represents a pluraltiy of individual "and" gates, one for each constituent lead carrying a bit of binary information. The other input to each of the "and" gates 151–156 is connected to a lead 157 which receives an output signal from a read-in flip-flop 158 when the read-in flip-flop assumes a state which for reference purposes shall be deemed the "1" state. A lead 159 applies an output signal from the read-in flip-flop 158 when the flip-flop 158 is in the opposite, or "0," state to the input information source 140 to inform the source 140 that the printer is not presently in a condition in which to receive information.

Output signals from the respective "and" gates 151–156 are applied to respective information receiving inputs of a plurality of column information storage registers 161–166, respectively. Each column register 161–166 may comprise, for example, the required plurality of flip-flops necessary to store each binary digit in the code used to designate the symbols to be printed (four flip-flops being required for each register in the ten-symbol indicia pattern of FIG. 8). The column information storage registers 161–166 may be reset by signals on a lead 167 which is connected via a delay network 168 to the input to the read-in flip-flop 158 which sets the read-in flip-flop to the "1" state. A lead 169 applies signals to the input to the read-in flip-flop 158 which sets this flip-flop to the "0" state.

Output signals from each of the column information storage registers 161–166 are applied to one input of respective column information comparator circuits 171–176, the other input to each of the comparators 171–176 receiving signals from a lead 178 which carries coded signals representative of the particular symbol about to arrive at the printing location 24. It is pointed out that, as before, the lead 178 conventionally represents a sufficient number of individual signal flow paths to carry enough binary digits to define each symbol to be printed, while each comparator circuit 171–176 represents sufficient comparison circuitry to compare each binary digit on the composite lead 178 with the corresponding binary digit received from the associated column information storage register 161–166 and to generate an output signal on respective leads 181–186 only when each pair of compared binary digits are alike, i.e. upon identity of the two binary coded input signals to the comparator in question.

The leads 181–186 are connected, respectively, to one input of a plurality of two-input sector "and" gates 191–196, one sector "and" gate being provided for each column location of symbols to be printed. The other input to each of the odd column sector "and" gates 191, 193 and 195 is connected to a lead 197 which receives a signal when the first mask sector (which contains symbols in the odd column locations) is adjacent the printing location, while the other input to each of the even column sector "and" gates 192, 194 and 196 is connected to a lead 198 which carries a signal when the second mask sector (which contains symbols in the even column locations) is adjacent the printing location.

Output signals from the sector "and" gates 191 and 192 are fed to respective inputs of a two-input "or" gate 201, while a like "or" gate 202 receives its inputs from "and" gates 193 and 194, and a further like "or" gate 203 receives inputs from the "and" gates 195 and 196. The output signals from the respective "or" gates 201–203 are applied to the inputs to respective flash tube flip-flops 211, 212 and 213 which set these flip-flops to the "1" state, the flip-flops 211–213 being set to the opposite, or "0," state by a reset signal on a lead 214. Output signals from the respective flip-flops 211–213 when these flip-flops are in the "1" state are applied to one input of respective two-input print "and" gates 221–223, the other input to each of the "and" gates 221–223 being received from a lead 224 to which there is applied a print command signal each time a row of symbols to be printed is adjacent the windows 100. Output signals from the respective print "and" gates 221–223 are applied to respective flash tube drive circuits 231–233 for the respective flash tubes 28a, 28b and 28c. Each flash tube drive circuit 231–233 is a trigger circuit, which, in response to an output signal from the associated print "and" gate 221–223, applies a rapidly rising high voltage to the flash tube electrodes. The gas within the tube is thus ionized to permit current flow between its electrodes, resulting in the emission of a high intensity rapid flash of light. The flash tube drive voltage is stored in a capacitor connected across the electrodes of the tube and which is charged in the interval between flashes. An example of a circuit which may be used for the drive circuits 231, 232, and 233 in conjunction with an FX-6A xenon flash tube is shown in FIG. II of bulletin 1001 of Edgerton, Germeshausen and Grier, Inc.

FIG. 9 (b) illustrates primarily the elements comprising the control logic block 36 of FIG. 1 for the particular mask indicia pattern shown in FIG. 8. Clock pulses generated by the clock channel sensing photodiode 62, after amplification and shaping in an amplifier 240, are applied to the trigger input of a drum address counter 242 to increase the count contained therein by one. The drum address counter 242 has a capacity equal to the number of different symbols in each column of the mask 25, which in the example of FIG. 8 is equal to ten, with each decimal numeral on the mask being represented by the corresponding normal binary code except that the numeral "0" is designated by the binary code corresponding to the decimal number "10." The drum address counter 242 applies signals to the individual leads constituting the signal flow path 178 in accordance with the binary code for the instantaneous count contained in the counter 242. Upon reaching its maximum count (ten in the selected example) the counter 242 furnishes an overflow signal on its output lead 244, and after passage through a delay network 246, this overflow signal is applied via a lead 248 to one input of a two-input "or" gate 250. The other input to the "or" gate 250 receives sync pulses generated by the sync channel sensing photodiode 64 and amplified and shaped in an amplifier 252. The output from the "or" gate 250 is applied to the input to the drum address counter 242 which resets the counter 242 to "0" so that upon receipt of either a sync pulse from the sync channel 60 or a delayed overflow pulse on the lead 244 (indicating that the drum address counter 242 has reached its maximum count), the drum address counter 242 is readied to count the pulses received from the clock channel 58 indicating the times when the respective rows of symbols on the mask 25 are about to pass the printing location.

The sync pulses from the amplifier 252 are also applied via a lead 254 to the input to a sector flip-flop 256 which sets the flip-flop 256 to a "first" stable state when the beginning of the first mask sector arrives at the printing location. The sector flip-flop 256 is set to its other, or "second" stable state by a signal applied to lead 258 from the delay network 246, the sector flip-flop 256 being set to its "second" stable state when the beginning of the second mask sector is about to arrive at the printing location. When the sector flip-flop 256 is in its "first" stable state an output signal is provided on the sector gate lead 197 for the odd sector gates 191, 193 and 195; while the sector gate lead 198 for the even sector gates 192, 194 and 196 receives a signal from the sector flip-flop 256 when the flip-flop 256 is in its "second" stable state.

The output signal from the delay network 246 is applied via a lead 260 to the trigger input of a control counter 262 having a capacity equal to $(n+1)$ where $n$ is the number of sectors into which the mask 25 is divided. The control counter 262 ensures that regardless of the position of the drum when a printing command is initiated, the indicia in every sector of the drum will be scanned for printing, after which a paper advance signal will be generated during which time printing will be inhibited. For the two-sector mask shown in FIG. 8, the control counter 262 is constructed with a capacity equal to "3," and the circuitry of FIG. 9 is designed such that when the control counter 262 contains a count of "0," an output signal will be provided on a lead 264 connected to one input of a two-input paper advance control "and" gate 266. The other input to the "or" gate 266 is received from a lead 268 to which a signal from a control flip-flop 270 is applied when the control flip-flop 270 is in the "1" state. The output signal from the "and" gate 266 is applied via a lead 272 to the paper drive mechanism 52 which may be the rotary solenoid 134 of FIG. 2. As long as an output signal is present on the lead 272, the paper drive mechanism 52 is activated to maintain the pinch roller 54 in contact with the paper 20 opposite the capstan roller 56 and thereby cause advancing of the paper 20. The capstan roller 56 is driven continuously by the motor 57 through a capstan roller drive mechanism 276 which may include suitable gearing so that the capstan roller 56 rotates at the proper speed to advance the paper 20 by one line each time the pinch roller 54 contacts the paper 20 during the normal operating sequence.

The output signal from the paper advance control "and" gate 266 is also applied to a leading edge differentiator circuit 278. The circuit 278 differentiates the step waveform applied thereto from the "and" gate 266 to produce a relatively sharp spike pulse at the leading edge of the applied step voltage. The output pulse from the differentiator circuit 278, which is applied to the lead 167, initiates the operation of reading information from the input information source 140 into the column information storage registers 161–166 upon the commencement of the paper advance cycle. The trigger signal on the lead 167 first clears the column information storage registers 161–166 so that they are ready to receive new information, and after a slight delay, sets the read-in flip-flop 158 to the "1" state to enable the "and" gates 151–156 to pass information from the source 140 to the registers 161–166. The circuit 278 may, depending upon the exact design used for the circuitry to which the signal on the lead 167 is applied, include a rectifier which prevents the spike voltage resulting from differentiation of the trailing edge of the output voltage from the "and" gate 266 from appearing on the lead 167.

When the control counter 262 contains the respective counts "1" and "2," indicating a print enable condition, output signals are applied to respective leads 280 and 282 which in turn are connected to the respective inputs of a two-input "or" gate 284 so that the "or" gate 284 is activated upon a signal from the control counter 262 indicating that either one of the two mask sectors is being scanned for printing. The output from the "or" gate 284 is applied via a lead 285 to one input of a three-input print control "and" gate 286. The second input to the "and" gate 286 is connected to the output lead 268 from the control flip-flop 270, while the third input to the "and" gate 286 is connected to a lead 288 which receives clock pulses from the amplifier 240 after they have passed through a delay network 290. The output from the delay network 290 is also connected to a further delay network 292, the output from which is applied to the reset lead 214 for the flash tube flip-flops 211–213. The delay provided by the network 290 corresponds to the time interval between when the clock pulse markers 138 on the clock channel 58 are sensed by the photodiode 62 and when the associated adjacent row of symbols on the mask 25 has moved into printing location opposite the windows 100. This delay ensures that all of the flash tube flip-flops 211–213 have been set to the proper state prior to a print command signal which is applied to the lead 224 upon the time coincidence of a print enable signal from the control counter 262, an operate signal from the control flip-flop 270, and a delayed clock signal on the lead 288. After the information contained in the flash tubes flip-flop 211, 212 and 213 has been read out through the respective "and" gates 221, 222 and 223 by the print command signal on the lead 224, the clock pulse on the lead 214 which has been further delayed by the network 292 resets the flip-flops 211, 212 and 213 so that they are ready to receive subsequent information.

The voltage on the output lead 230 from the control counter 262 is applied to a leading edge differentiator circuit 294 which differentiates the leading edge of the step voltage on the lead 280 to produce a spike pulse which is applied to the lead 169 connected to the input to the read-in flip-flop 158 which sets the flip-flop 158 to the "0" state. Thus, a signal is applied to the lead 169 at the instant when the control counter 262 assumes a count of "1," indicating that the paper advance mode of operation has just terminated and that the printing mode is beginning. The signal on the lead 169 terminates the read-in cycle by setting the read-in flip-flop 158 to the "0" state so that the "and" gates 151–156 are disabled. This ensures that new information will not be read into the printer signal processing circuitry during printing.

The remaining portion of the control logic ensures proper synchronization of signals during turn-on and turn-off of the apparatus to avoid loss of information and other undesired effects such as spurious printing. An operate switch 300 has a movable contact arm 302 connected to a power supply 304 and adapted to move into and out of contact with a fixed switch terminal 306. The terminal 306 is connected to the input to a differentiator circuit 308 which provides spike pulses of opposite polarity at the respective instants when the switch arm 302 is opened and closed. A rectifier circuit 310, connected to the output of the differentiator 308, passes the spike pulse which occurs at the onset, or leading, edge of the step voltage resulting from closure of the switch 300. Similarly, a rectifier-inverter circuit 312, also connected to the output of the differentiator 308, is arranged in such polarity as to pass the spike pulse at the termination, or trailing, edge of the step voltage produced by opening the switch 300, with the pulse provided by the circuit 312 being inverted so as to be of the same polarity as that produced by the circuit 310.

The output pulse from the leading edge rectifier 310 is applied to a one-shot multivibrator circuit 314 which, in response to a trigger pulse from the leading edge rectifier 310, provides an output voltage for a preselected interval of time equal to the duration of a normal paper advance cycle, which in the illustrative example under consideration is equal to the time required for the drum 26 to rotate through 180°.

The output from the one-shot multivibrator 314 is applied to one input of a two-input "or" gate 316, the output from which is connected to an input to the control counter 262 which maintains the control counter 262 at the count of "0" regardless of signals applied to its trigger input from the lead 260. This ensures that each time the printer is instructed to commence operation by closure of the operate switch 300 (regardless of the position of the drum 26 and the state of the remaining portion of the circuitry at the instant the operate switch 300 is closed), the control counter 262 will always be placed in the "0" state so that the paper will be advanced by at least one line. Thus, not only is printing on fresh paper ensured, but also the first printing operation after closure of the switch 300 is made to commence at the beginning of a mask sector scan.

The output pulse from the leading edge rectifier 310 is also applied via a delay network 318 to the input to the control flip-flop 270 which sets the flip-flop 270 to the "1" state so that the paper advance control and print control "and" gates 266 and 286, respectively, are enabled to pass output signals from the control counter 262. The control flip-flop 270 ensures that printing will not occur until the operate switch 300 has been closed.

The output signal from the trailing edge rectifier-inverter circuit 312 is applied to a one-shot multivibrator circuit 320 which is similar to the one-shot multivibrator 314 and which responds to a pluse from the circuit 312 to provide an output voltage for a preselected interval of time equal to the duration of a complete sequence of one cycle of printing and paper advance. In the example under consideration this time interval is equal to the time required for the drum 26 to make one and one-half revolutions.

The output from the one-shot multivibrator 320 is applied to one input of a two-input "and" gate 322, the other input to which is received from a trailing edge differentiator-inverter circuit 324 which differentiates and inverts the trailing edge of the step voltage provided on the control counter output lead 282 when the counter 262 contains a count of "2." Thus, the control flip-flop 270 is set to the "0" state only upon the time coincidence of a signal from the multivibrator 320, resulting from the opening of the operate switch 300, and a trigger signal marking the termination of the printing mode, i.e., when the count in the control counter 262 is switched from "2" to "0." This ensures that a printing mode will be completed before the control circuitry is allowed to turn-off.

In some instances it may be desired to rapidly develop the portion of the paper 20 on which printing has occurred and separate it from the remaining paper being supplied from the roll 22 without waiting for subsequent printing to occur. For this purpose a rapid paper advance mode of operation is afforded during which the paper 20 is continuously advanced while all printing is inhibited. A manually operated paper advance switch 330 has a movable contact arm 322 connected to the power supply circuitry 304 and adapted to move into and out of contact with a fixed switch terminal 336. The terminal 336 is connected to the input to a differentiator circuit 338, similar to the differentiator circuit 308, with the output from the differentiator 338 being connected to a leading edge rectifier circuit 340 and a trailing edge rectifier-inverter circuit 342, similar to the respective circuits 310 and 312. The leading edge rectifier 340 provides a spike pulse at the instant the paper advance switch 330 is closed, while the trailing edge rectifier-inverter 342 produces a spike pulse of the same polarity upon the opening of the paper advance switch 330. The output from the leading edge rectifier 340 is applied to the input to a paper advance flip-flop 344 which sets this flip-flop to the "1" state, while the output from the trailing edge rectifier-inverter 342 is applied to the input to the flip-flop 344 which places the flip-flop 344 in the opposite, or "0," state. Thus, the paper advance flip-flop 344 is maintained in the "1" state as long as the paper advance switch 330 is in the closed position, and at all other times is maintained in the "0" state.

Although it is generally desired that the paper advance mode of operation be maintained as long as the paper advance flip-flop 344 is in the "1" state, any printing which may be occurring at the instant the paper advance flip-flop 344 is triggered to the "1" state should not be interrupted. Thus, a two-input "and" gate 346 is provided having one of its inputs connected to receive an output signal from the paper advance flip-flop 344 when the flip-flop 344 resides in the "1" state and the other of its inputs connected via a lead 348 to the control counter output lead 264 which carries a signal when the control counter 262 contains a count of "0." The "and" gate 346 ensures that the paper advance flip-flop 344 will not apply its signal to the control counter 262 to hold the counter 262 to a count of "0" until the control counter 262 assumes a count of "0" in its regular course of operation, as indicated by the feedback signal on the lead 348. Thus, any printing which may have been occurring at the instant the paper advance flip-flop 344 is triggered is allowed to be completed prior to the time when the rapid paper advance mode of operation takes effect. When the paper advance flip-flop 344 is returned to its "0" state, the "and" gate 346 no longer provides an output so that the control counter 262 is allowed to count the trigger pulses on the lead 260 in its normal manner.

Electrical energy for operating the developing light 32, the sensing light 66, the heater 34, and the motor 57, as well as for providing the bias potentials necessary for the switches 309 and 330, the flash tubes 28, and the gates, flip-flops, counters and other circuit components in the printer, is supplied from conventional and appropriately tapped power supply circuitry designated generally by the numeral 304. A manually operated on-off master switch 350 may be provided to control the application of electrical power from the supply circuitry 304 to the various electrical elements in the printer.

The operation of the printer described above will now be discussed with reference to the timing waveforms of FIGS. 10 and 11. First, the on-off switch 350 for the power supply circuitry 304 is closed to energize the motor 57, and thus commence rotation of the drum, as well as to turn on the developing light 32, the heater 34, and the sensing light 66. As the drum 26 rotates, every time the sync marker 136 on the mask 25 passes by the photodiode 64 (i.e., for every complete revolution on the drum 26) a sync pulse shown by the waveform 400 in FIG. 10 (a) is generated. The sync pulse 400 not only sets the sector flip-flop 256 to its "first" state in which an output is provided on the sector gate lead 197, but it also sets the drum address counter 242 to "0." As each marker 138 in the clock channel 58 passes by the photodiode 62, a symbol clock pulse 402 is generated, as is shown in FIG. 10 (b), which advances the count contained in the drum address counter 242 by one. Each clock pulse 402 precedes the arrival of the associated row of symbols at the windows 100 by a slight time which enables the electronic signal processing circuitry to compare signals representative of the row of symbols about to arrive at the print location with signals representative of the symbols to be printed and to generate the appropriate print command signals.

Binary coded signals representing the instantaneous count contained in the drum address counter 242 are applied via the signal flow path 178 to the respective comparator circuits 171–176 where the drum address count is compared with respective symbol representing binary coded signals stored in the respective column information storage registers 161–166. When the drum address counter 242 reaches its maximum count (ten in the example under discussion), an overflow pulse is generated on the lead 244, and after passage through the delay 246, this overflow pulse functions as a sector end pulse 403 shown in FIG. 10 (c). The sector end pulse 403 sets the sector flip-flop 256 to its "second" state in which an output is provided on the sector gate lead 198, and in addition, resets the drum address counter 242 to "0" so that the counter 242 is ready to count subsequent clock pulses generated from the markers 138 in the second sector of the mask 25. The output signal on the lead 197 is represented by the waveform 404 of FIG. 10 (d), while the output signal on the lead 198 is represented by the waveform 405 of FIG. 10 (e). Symbol clock pulses 402a, b, c, d etc. from the markers 138 in the second sector advance the count of the drum address counter 242 by one, and when the drum address counter reaches its maximum count, a sector end pulse 403' is generated which resets the drum address counter 242 to "0." However, the sector end pulse 403' has no effect on the sector flip-flop 256 since this flip-flop is already in its "second" state, the sector flip-flop 256 being returned to its "first" state by the following sync pulse 400.

When it is desired to commence a printing operation, the operate switch 300 is closed to apply an operate signal, illustrated by the waveform 406 of FIG. 11 (c), to the differentiator 308. For referencing purposes the sync pulses 400 and the sector end pulses 403 and 403' of FIGS. 10 (a) and (c) are repeated in FIGS. 11 (a) and (b), respectively, on a time scale condensed from that of FIG. 10. The signal 406 is differentiated by the differentiator 308 to produce a narrow spike at its leading edge which, after passage through the leading edge rectifier 310, is applied to the one-shot multivibrator 314. The multivibrator 314 then provides an output pulse 408, illustrated in FIG. 11 (d), of a predetermined duration equal to half the time interval between sync pulses 400. The multivibrator output pulse 408 is applied to the control counter 262 to maintain a count of "0" in the counter 262 for the duration of the pulse 408. While containing a count of "0," the counter 262 provides an output signal 410 of FIG. 11 (e) on its output lead 264.

The differentiated leading edge of the operate signal 406 is also applied via the delay network 318 to the control flip-flop 270 to set the control flip-flop 270 to the "1" state. When in the "1" state the flip-flop 270 furnishes an output signal 412 of FIG. 11 (i) on its output lead 268. Since signals are now present on both inputs to the paper advance control "and" gate 266, a signal is applied via the lead 272 to the paper drive mechanism 52 to move the pinch roller 54 into contact with the paper 20 and thereby advance the paper 20.

The output signal from the paper advance control "and" gate 266 is differentiated in the leading edge differentiator 278 to produce a read-in start pulse 414 of FIG. 11 (j) at the leading edge of the signal on the lead 272. The read-in start pulse 414 commences the period during which information from the input information source 140 may be read into the electronic signal processing portions of the printer of the invention by first resetting the column information storage registers 161–166 to

15

"0" so that they are ready to receive more information and, after passing through the delay network 168, setting the read-in flip-flop 158 to the "1" state. While in the "1" state the read-in flip flop 158 provides an output signal 416 of FIG. 11 (*l*) on the lead 157 which enables the "and" gates 151–156 to pass information on the respective output leads 141–146 from the information source 140. In the example under consideration it will be assumed that the symbols "212412" are to be printed along a given line on the paper 20 and that binary coded signals corresponding to these symbols are presently available in the input information source 140. Thus, during the presence of the waveform 416 from the read-in flip-flop 158, binary coded signals corresponding to the respective digits "2," "1," "2," "4," "1," and "2" are read out of the input information source 140 and into the respective storage registers 161–166.

After the termination of the output pulse 408 from the one-shot multivibrator 314, the next sector end pulse 403 from the drum address counter 242 which is applied to the trigger input to the control counter 262 is able to advance the count of the counter 262 to a "1" so that an output signal 418, illustrated in FIG. 11 (*f*), is provided on the output lead 280 from the counter 262. The signal 418 is differentiated in the leading edge differentiator 294 to produce a sharp read-in stop pulse 420 of FIG. 11 (*k*) at the onset of the waveform 418 and apply the pulse 420 to the lead 169. The read-in stop pulse 420, which marks the end of the interval during which information may be read into the printer from the input information source 140, resets the read-in flip-flop 158 to the "0" state, thereby terminating the pulse 416. This disables the "and" gates 151–156 and applies a signal via the lead 159 to the input information source 140 to inform the input information source not to send further information to the printer since a printing operation is about to commence.

When the count in the control counter 262 is advanced to "1," the resulting output signal 418 on the lead 280 passes through the "or" gate 284 to apply a print enable signal, shown by the waveform 422 of FIG. 10 (*f*) to the "and" gate 286 via the lead 285. In the example under discussion, the first symbol clock pulse 402*a* generated after commencement of the print enable signal 422 occurs when the first row of symbols (1's) in the second sector are about to arrive at the windows 100. It should be understood, however, that in general either the second mask sector or the first mask sector may be scanned for printing first depending upon the position of the drum 26 at the instant the operate switch 300 is closed. The first symbol clock pulse 402*a* advances the count in the drum address counter 242 to "1," and a binary coded signal representing this count is applied to each column information comparator circuit 171–176. Since binary coded signals representing the symbol "1" are presently stored in the second and fifth column storage registers 162 and 165, respectively, the column 2 comparator circuit 172 and the column 5 comparator circuit 175 provide output signals on their respective output leads 182 and 185. At this time the sector flip-flop 256 is in its "second" state so that a signal 405 is present on the lead 198 but no signal 404 exists on the lead 197. Thus, the "and" gate 192 passes the second column comparator output on the lead 182, while the "and" gate 195 blocks the fifth column comparator output on the lead 185. As a result, only the first flash tube flip-flop 211 is set to the "1" state, as is illustrated by the signal 424 of FIG. 10 (*h*).

After passing through a delay network 290, the symbol clock pulse 402*a* is applied to the print control "and" gate 286, and since time coincidence of the three inputs to the "and" gate 286 is now established, the "and" gate 286 passes this pulse to provide a print command pulse 426*a*, shown in FIG. 10 (*g*), on the lead 224. The print command pulse 426*a* occurs at the instant when the symbols "1" in the second, fourth and sixth columns of the mask 25 are adjacent the respective windows 100. However, since only the first flash tube flip-flop 211 is

16 in the "1" state at this time, only the "and" gate 221 passes the print command pulse 426*a* and only the first flash tube 28*a* adapted to illuminate the first and second mask columns is triggered at this time. Thus, a latent image of the symbol "1" in the second mask column is formed on the paper 20. After the slight additional delay provided by the delay network 292, the first symbol clock pulse 402*a* resets the first flash tube flip-flop 211 to the "0" state.

When the second marker 138 in the second mask sector passes the photodiode 62, the next symbol clock pulse 402*b* is generated which advances the count in the drum address counter to "2." A binary coded signal corresponding to the number "2" is applied to the comparator circuits 171–176, and for the exemplary word "212412" to be printed, correspondence is detected by the first comparator 171, the third comparator 173, and the sixth comparator 176. However, since the second mask sector is presently being scanned, only the detected "2" in the sixth column will be printed at this time, and thus only the "and" gate 196 is enabled. As a result, only the third flash tube flip-flop 213 is set to the "1" state at this time, as shown by the signal 428 of FIG. 10 (*j*). The ensuing print command pulse 426*b* is passed by the "and" gate 223 to trigger the drive circuit 233 for the third flash tube 28*c* and thereby print the symbol "2" in the space on the paper 20 opposite the sixth mask column.

The next symbol clock pulse 402*c* advances the count in the drum address counter 242 to "3," resulting in a search of the column information storage registers 161–166 for signals representing symbols "3" to be printed. Since no symbols "3" are to be printed on this line none of the comparator circuits 171–176 provide an output, and none of the flash tubes 28 are triggered by the print command signal 426*c* which occurs when the third row of symbols in the second sector is adjacent the windows 100.

The following symbol clock pulse 402*d* advances the count in the drum address counter 242 to "4," searching the column information storage registers 161–166 for signals representing symbols "4." The fourth column comparator circuit 174 provides an output at this time which passes through the "and" gate 194 to set the second flash tube flip-flop 212 to the "1" state, as illustrated by the waveform 430 of FIG. 10 (*i*). Upon the occurrence of the following print command pulse 426*d*—the "and" gate 222 passes the print command pulse 426*d* and triggers the drive circuit 232 to flash the second flash tube 28*b* and thereby print the symbol "4" in the fourth mask column. Since none of the remaining symbols "4," "5," "6," "7," "8," "9" and "0" in the second mask sector are to be printed on this line of the paper 20, none of the flash tube flip-flops 211–213 are set to the "1" state and none of the ensuing print command pulses 426 in the present sequence result in the flashing of any of the flash tubes 28.

After the last row of symbols in the second mask sector has been scanned for printing, the sector end pulse 403' generated by the drum address counter 242 resets the drum address counter to "0" and triggers the control counter 262 to advance the count contained in the counter 262 to "2." The control counter then provides an output on the lead 282, as shown by the waveform 432 of FIG. 11 (*g*). Upon receipt of the next sync pulse 400, indicating that the symbols in the first mask sector are about to pass by the print location, the sector flip-flop 256 is set to its "first" state to provide an output signal 404 on the lead 197. Upon generation of the first symbol clock pulse 402*e* after the sync pulse 400, the count in the drum address counter 242 is advanced to "1," the second and fifth column comparator circuits 172 and 175 detect a correspondence, the "and" gate 195 passes the output from the comparator circuit 175, and the third flash tube flip-flop 213 is set to the "1" state, as shown by the waveform 434 of FIG. 10 (*j*). Upon the occurrence of the next print command pulse 426*e* on the lead 224, the third flash tube drive circuit 233 is triggered to flash the flash tube 28c and thereby print the symbol "1" in the space on the paper 20 opposite the fifth mask column.

Generation of the next symbol clock pulse 402f results in a searching of the column information storage registers 161–166 for signals representative of symols "2" to be printed and the setting of the first and second flash tube flip-flops 211 and 212 to the "1" state, as shown by the respective waveforms 436 and 438 of FIGS. 10 (h) and 10 (i). On the next print command pulse 426f, both flash tube drive circuits 231 and 232 are triggered, resulting in the simultaneous flashing of the flash tubes 28a and 28b and the simultaneous printing of the symbols "2" in the region of the paper 20 allotted to receive information from the first and third mask columns. Since, in the example under discussion no further symbols are to be printed from the first mask sector, none of the flash tubes 28 are flashed during the remainder of this scan of the first sector. At the end of this sector scan, the sector end pulse 403 from the drum address counter 242 resets the drum address counter 242 to "0," sets the sector flip-flop 256 to its "second" state, and advances the count in the control counter 262 to "0," thereby terminating the print enable signal 422 on the lead 285. As the counter 262 reverts to its "0" state, the resulting signal on the lead 272 causes the paper 20 to be advanced by one line, and a read-in start pulse 414 is provided on the lead 167 which initiates the transfer of new information from the input information source 140 to the column information storage registers 161–166.

Assume that it is now desired to obtain the line of information just printed on the paper 20 as soon as possible, rather than to wait for this line of information to exit from the printer in the normal course of operation in which further lines are printed. The printer may then be placed in the rapid paper advance mode of operation by closing the paper advance switch 330. Upon closure of the switch 330, a pulse is produced by differentiator 338 and leading edge rectifier 340 which sets the paper advance flip-flop 344 to the "1" state, as is shown by the waveform 440 of FIG. 11 (m). As may be seen from FIG. 11 (f), at the time the paper advance flip-flop 344 is triggered to the "1" state, the control counter 262 contains a count of "1." Thus, the signal 440 is blocked by the "and" gate 346 until the count in the control counter 262 is returned to "0" so that any printing operation in progress will not be interrupted. When the control counter count does reach "0," the signal 440 is passed by the "and" gate 346 and holds the control counter 262 in the "0" state regardless of pulses applied to its trigger input via the lead 260. As shown by the waveform 410' of FIG. 11 (n), the "0" output from the control counter 262 on the lead 264 remains as long as the paper advance flip-flop 344 is in the "1" state. When the paper 20 has advanced sufficiently to remove the printed line of information from the apparatus, the paper advance switch 330 is opened to return the paper advance flop-flop 344 to the "0" state and terminate the waveform 440. Upon the next sector end pulse on the lead 260, the count in the control counter 262 is advanced to "1" and normal operation resumes.

When it is desired to terminate operation of the printer, the operate switch 300 is opened, and the differentiator 308 and trailing edge rectifier-inverter 312 produce a pulse which triggers the one-shot multivibrator 320. The multivibrator 320 then provides an elongated output pulse illustrated by the waveform 442 of FIG. 11 (h). The duration of the waveform 442 is equal to the time interval required for a complete cycle of paper advance and printing so that any such cycle which may be in progress at the instant the operate switch is opened is allowed to be completed. At the end of the operating cycle in progress, the differentiated trailing edge of the control counter output on the lead 282 passes through the "and" gate 322 to set the control flip-flop 270 to the "0" state, thereby terminating the waveform 412 and preventing any further printing or paper advancing operations from occurring.

In many instances it is desirable to provide a visual display of the information during the printing process to check for possible errors or malfunction of the equipment. Since the paper 20 used in the printer may be translucent, an embodiment of the present invention in which such a visual display is provided is illustrated in FIG. 12. In this embodiment a transparent paper guide element 500 is substituted for the element 78 in the embodiment of FIG. 2. The guide element 500, which may be of glass or a transparent plastic, defines a convexly curved surface 502 over which the paper 20 passes adjacent the surface of the drum 26 at the printing location. On the side of the surface 502 away from the drum 26, the element 500 defines a portion 504 in the shape of a right triangular prism, with the legs in each triangular surface being respectively disposed parallel and perpendicular to the axis of the drum 26. A mirror 506, which may be of polished steel, for example, is disposed along the rectangular face of the prism 504 which contains the hypotenuse of each triangular surface in order to reflect the image of the symbols being printed onto a viewing surface 508 which is provided along the rectangular face of the prism 504 disposed perpendicular to the drum axis. A filter 510 may be provided along the viewing surface 508 in order to prevent light from outside of the printer from traveling in a backward direction through the prism 504 to the paper 20 adjacent the drum 26 and thereby exposing the paper.

It is pointed out that since the symbol illumination occurs at a rate in excess of that capable of being detected by the human eye, it is necessary to provide additional control circuitry very similar to that used for the rapid paper advance mode of operation which, in response to an observe command signal, retains the print image for a time long enough to be perceived by the human eye, while preventing data changes and further printing from occurring during the duration of the observe command signal.

It is further pointed out that whereas the printer of the present invention has been illustrated as operating with a stop-start type of paper advance system in which the paper is advanced a line at a time after each printing cycle has been completed, a printer in accordance with the present invention may utilize a continuous paper advance system. However, such a paper advance system requires a correction of the flash tube flashing times in accordance with the ratio of drum peripheral velocity to paper velocity so that the last printed symbols are aligned with the first printed symbols. This may be accomplished by associating each row of symbols on the mask 25 with an individual clock pulse marker 138 (as in the example illustrated in FIG. 8), and an addition by varying the spacing between the clock pulse markers 138 and the associated rows of symbols to produce a varying time lag between symbol detection and printing for successive rows of symbols such that the printed symbols are aligned with each other on the moving paper. The desired alignment may also be accomplished electronically by progressively adding a clock increment to each symbol clock pulse to produce variably lagging print command pulses.

It is also pointed out that by making the mask indicia pattern in the form of a plurality of closely spaced columns of a plurality of variably sized transparent dots and by controlling the flash tubes to print selected dots in accordance with binary coded signals indicative of the degree of the tone, or contrast, of various tiny elemental areas of a pictorial representation (the darker the elemental area the larger the dot selected), halftone reproductions of the pictorial representation may be afforded with a printer in accordance with the present invention.

Thus, although the present invention has been shown and described with reference to particular embodiments, nevertheless, various changes and modifications obvious to a person skilled in the art to which the invention pertains are deemed to lie within the spirit, scope, and contemplation of the invention as set forth in the appended claims.

What is claimed is:

1. Printing apparatus comprising: means for supporting a photosensitive surface on which printing is to occur and for moving said surface through first and second locations, a drum mounted for rotation about an axis parallel to a line through said first location along which printing is to occur, at least a portion of the circumferential surface of said drum being transparent, an opaque mask defining a plurality of first and second transparent regions and a third transparent region disposed along the circumferential surface of said drum with said transparent regions located adjacent a transparent portion of said drum, said first transparent regions containing symbols to be printed and being arranged in rows and columns, each said row extending along a different line parallel to said axis and each said column extending along the circumference of a circle defined by the intersection of said mask with a different plane perpendicular to said axis, said second transparent regions extending along the circumference of a circle defined by the intersection of said mask with another plane perpendicular to said axis, each said second transparent region being associated with a different row of said first transparent regions, said third transparent region being disposed at a predetermined circumferential location along said mask in still another plane perpendicular to said axis, said first transparent regions being adapted to move through a region adjacent said first location, said second transparent regions being adapted to move through a third location, said third transparent region being adapted to move through a fourth location, a plurality of intermittently operable light sources each mounted at a fixed location within said drum axially displaced with respect to the location of every other intermittently operable light source, means for guiding light from the respective intermittently operable sources toward the respective portions along said line through said first location traversed by the respective columns of transparent regions on said mask, a developing light source positioned to illuminate the region of said photosensitive surface at said second location, a sensing light source, means for directing light from said sensing light source toward said third and fourth locations, first photosensitive means disposed adjacent said fourth location on the opposite side of said mask from said sensing light source for detecting light from said sensing light source which passes through said third transparent region of said mask and for generating therefrom a reference signal indicative of the instantaneous angular position of said drum, second photosensitive means disposed adjacent said third location on the opposite side of the said mask from said sensing light source for detecting light from said sensing light source which passes through said second transparent regions and for generating therefrom a timing signal when each of said second transparent regions passes through said third location, means responsive to said reference signal and to said timing signals for generating a plurality of first coded signals each representative of the instantaneous position of a row of transparent regions on said mask relative to said line through said first location, means for storing a plurality of second coded signals each representative of a selected symbol to be printed along said line through said first location from a different column of transparent regions on said mask, means for comparing each of said first coded signals with each of said second coded signals and for providing a command signal upon each correspondence of a first and a second coded signal, and means responsive to each command signal for triggering the intermittently operable light source adapted to illuminate the column associated with the said second coded signal resulting in the generation of said command signal when the row associated with the said first coded signal resulting in the generation of said command signal is adjacent said line through said first location.

2. Printing apparatus comprising: a guide element having a convexly curved surface disposed parallel to a predetermined axis, a drum mounted for rotation about an axis parallel to said predetermined axis at least a portion of the circumferential surface of said drum being transparent and being adapted to move through a region adjacent said convexly curved surface, said guide element being of transparent material and defining a prismatically shaped portion disposed on the side of said convexly curved surface away from said drum for conveying an image projected onto said convexly curved surface from the face of said prismatically shaped portion nearest said convexly curved surface to a viewing surface along another face of said prismatically shaped portion, an opaque mask defining a plurality of transparent regions containing indicia to be printed disposed along the circumferential surface of said drum with said transparent regions located adjacent a transparent portion of said drum, a plurality of intermittently operable light sources each mounted at a fixed location within said drum axially displaced with respect to the location of every other intermittently operable light source, means for guiding light from each intermittently operable light source toward a different region along a line through said convexly curved surface parallel to said predetermined axis, said transparent regions of said mask being arranged such that different portions of said indicia are capable of traversing the respective paths of light from different ones of said intermittently operable light sources, means for rotating said drum, means for measuring the instantaneous position of said transparent regions on said mask relative to said line through said convexly curved surface and in response to an input signal indicative of indicia to be printed for triggering the appropriate intermittently operable light source when the indicia corresponding to said input signal lies in the path of light from said appropriate intermittently operable light source, a lighted chamber, and means for moving a photosensitive surface on which printing is to occur first between said convexly curved surface and said mask and subsequently into said lighted chamber.

References Cited by the Examiner
UNITED STATES PATENTS

| | | | |
|---|---|---|---|
| 2,364,188 | 12/1944 | Bryce | 95—4.5 X |
| 2,714,841 | 8/1955 | Demer | 95—4.5 |
| 2,726,940 | 12/1955 | Buhler | 95—4.5 X |
| 2,843,840 | 7/1958 | Brinster | 340—173 |
| 3,059,219 | 10/1962 | O'Brien | 95—4.5 X |
| 3,143,940 | 8/1964 | Brown | 95—89 X |

JOHN M. HORAN, *Primary Examiner.*